(12) United States Patent
Valentine et al.

(10) Patent No.: US 7,216,681 B2
(45) Date of Patent: May 15, 2007

(54) GRAVITY FEED BALL-IN-SEAT VALVE WITH EXTENSION UNIT FOR DOSING FUEL ADDITIVES

(75) Inventors: James M. Valentine, Fairfield, CT (US); Laura K. Valentine, Fairfield, CT (US)

(73) Assignee: Clean Diesel Technologies, Inc., Stamford, CT (US)

( * ) Notice: Subject to any disclaimer, the term of this patent is extended or adjusted under 35 U.S.C. 154(b) by 0 days.

(21) Appl. No.: 11/074,199

(22) Filed: Mar. 7, 2005

(65) Prior Publication Data

US 2005/0217751 A1  Oct. 6, 2005

Related U.S. Application Data

(60) Provisional application No. 60/550,459, filed on Mar. 5, 2004.

(51) Int. Cl.
*B65B 1/04* (2006.01)
(52) U.S. Cl. .................. 141/349; 141/69; 141/100; 141/301; 123/1 A; 123/73 AD; 137/114
(58) Field of Classification Search .................. 141/9, 141/11, 69, 98, 100–107, 301, 309, 310, 351, 141/360, 361, 362, 392, 349; 123/1 A, 73 AD, 123/198 A; 137/98, 114; 251/259
See application file for complete search history.

(56) References Cited

U.S. PATENT DOCUMENTS

| 4,402,351 | A | * | 9/1983 | Momura et al. ............. 141/98 |
| 4,596,277 | A | * | 6/1986 | Djordjevic ................... 141/98 |
| 4,971,118 | A | * | 11/1990 | Cluff .......................... 141/103 |
| 5,992,473 | A | * | 11/1999 | Hammonds ................... 141/9 |

* cited by examiner

*Primary Examiner*—Timothy L. Maust
(74) *Attorney, Agent, or Firm*—Thaddius J Carivs

(57) ABSTRACT

A simple, reliable system is provided for automatically dosing vehicle fuel tanks with a fuel additive, particularly a concentrate containing a fuel borne catalyst (FBC), using gravity as the means of injection, preferably with no electronics or complex mechanical parts. The system includes a supply line for feeding fuel additive by gravity from an additive reservoir and opening into a filler spout of a fuel tank, a ball-in-seat valve at the end of the supply line biased in normally closed position and operable to an open position by mechanically pressing a release on the ball-in-seat valve, and a pivotable lever positioned within the filler spout and including a projection capable of mating with the ball-in-seat valve release upon pivotable movement. Upon insertion of a filler hose into the filler spout, the filler hose moves the lever and projection to press the release on the ball-in-seat valve thereby dispensing additive.

5 Claims, 2 Drawing Sheets

GRAVITY FEED BALL-IN-SEAT VALVE WITH EXTENSION UNIT FOR DOSING FUEL ADDITIVES

RELATED APPLICATION AND PRIORITY CLAIM

This application is related to and claims priority to copending U.S. Provisional Patent Application No. 60/550/459, filed Mar. 5, 2004.

BACKGROUND OF THE INVENTION

The invention relates to a simple, reliable system for automatically dosing vehicle fuel tanks with a fuel additive, particularly a concentrate containing a fuel borne catalyst (FBC), using gravity as the means of providing a constant flow into the fuel, preferably with no electronics or complex mechanical parts.

Fuel additives are known in the art to provide improvements in combustion, handling and storage characteristics of fuels such as gasoline, diesel and alternative and bioderived fuels used in internal combustion engines. Exemplary additives used to control engine deposits, improve cold flow characteristics, promote more complete in-cylinder combustion or regenerate a diesel particulate filter.

The invention relates to simple mechanical devices that enable a simple and reliable introduction of a fuel additive into the fuel tank when fueling a vehicle, particularly one powered by a medium or light duty diesel engine. Fuel additives, especially FBC's in the form of concentrates containing platinum group metals, cerium, iron, copper, manganese, magnesium and the like or combinations, can enable cleaner burning of a fuel in an engine, thereby allowing for more efficient operation of the engine. The additives can also reduce pollutants as a primary measure or in combination with an after treatment device.

While additives can be added to the fuel at any point in the distribution chain including at the refinery or bulk storage terminal, there are many cases where addition of additives to specific vehicle fuel tanks is desired. Vehicles equipped with diesel particulate filters can rely on fuel borne catalyst additives to regenerate filters; however not all vehicles in a fleet may have filters and therefore additive treated fuel may be desired for a select group of vehicles. In other cases vehicles may fuel away from a home terminal at retail fuel outlets where additive treatment may not be available at the fuel dispensing site. With this system, vehicles are free to fuel to fuel at any location and still receive treated fuel.

Many prior art systems proposed for dosing additives involve complex monitoring electronically and/or mechanically to achieve the desired concentration of active catalytic metals in the fuel. The provision of systems that require modifications to fuel tanks or to wiring harnesses are not practical for retrofit applications due to the great variety of trucks being used commercially, even by a single fleet owner. On board dispensing systems mounted on a vehicle are known in the art and generally include a reservoir to store liquid additive on the vehicle to treat a known amount of fuel. These systems typically involve measurement of fuel level in the fuel tank using floats or sensors and the use of hydraulic or electric pump and metering systems to dispense additive from the reservoir into the fuel tank or fuel feed line to or from the engine. Other systems can inject pulses of additive under pressure at preset time intervals or as a function of engine operation by using an electronically controlled solenoid valve or pulsed pumping system. These systems all involve sophisticated and expensive electronics, pumps, controllers and sensors to meter the additive and often lead to high or low additive concentrations in the fuel tank as fuel level rises or falls due to addition or consumption of fuel. this system does not require any of these parts.

Yet other prior art systems require operator monitoring and/or intervention. However, fleet operators need the assurance that an FBC additive concentrate is being properly added to the fuel of designated vehicles without requiring a particular operator to perform any task other than his normal fueling operation. Operator monitoring or intervention can be problematic, especially where the same vehicle is used by different operators.

Current and proposed regulations challenge manufacturers to both achieve good fuel economy and reduce emissions. While fuel additives will likely be necessary to achieve the objectives of the regulations, the art has provided no simple device capable of metering an effective additive into the fuel in a reliable manner with no operator intervention or attention.

What is needed is a simple mechanical additive dosing system that dispenses additive into the fuel in proportion to the fuel being added to the fuel tank of an internal combustion engine.

BRIEF SUMMARY OF THE INVENTION

It is an objective of the invention to provide a simple mechanical additive dosing system that dispenses additive into the fuel in proportion to the fuel being added to the fuel tank of an internal combustion engine.

It is another objective of the invention to provide a simple, reliable additive dosing system for automatically introducing fuel additive into a fuel tank for the purpose of enhancing the operation of an internal combustion engine and/or reducing emission of pollutants.

It is another objective of the invention to eliminate the requirement of the vehicle operator to have to monitor or activate any device on the vehicle so as to accomplish dosing of the fuel tank with fuel additive.

It is another objective of the invention to dose the fuel tank at a predetermined rate which corresponds to a predetermined average fueling rate from the fuel pump.

It is another objective of invention to activate the system automatically when a filler hose is inserted into the fuel tank and deactivated when the fuel filler hose is removed from the tank.

These and other objects are accomplished by the invention which provides a simple, reliable system for automatically dosing fuel tanks with a fuel additive, particularly a concentrate containing a fuel borne catalyst (FBC), using gravity as the means of injection and is operable by insertion of a filler hose into the filler spout of a fuel tank, comprising: a supply line for feeding fuel additive by gravity from an additive reservoir and opening into a filler spout of a fuel tank; a ball-in-seat valve at the end of the supply line biased in normally closed position and operable to an open position by mechanically pressing a release on the ball-in-seat valve; and a pivotable lever positioned within the filler spout and including a projection capable of mating with the ball-in-seat valve release upon pivotable movement, wherein the pivotable lever is configured to move from an initial position wherein it interferes with the insertion of a filler hose into the filler spout but is movable by insertion of a filler hose to a position wherein the projection presses the spring loaded ball on the ball-in-seat valve causing a release of additive into the fuel tank.

In one embodiment, the ball-in-seat valve, the pivotable element and the projection are comprised in a filler spout extension module.

In another embodiment, the ball-in-seat valve, the pivotable element and the projection are comprised in a module configured to fit within the opening of a filler spout.

From another perspective the invention provides a mechanical ball-in-seat valve liquid dispensing system for the addition of fuel additives into a fuel tank containing gasoline, diesel or alternative fuels used to power an internal combustion engine, wherein such ball-in-seat valve is opened to dispense additive into the fuel tank by the inserting of a fuel delivery nozzle into the fuel fill spout of a fuel tank and said valve is closed by removing the fuel nozzle.

Other preferred aspects of the invention will be shown in the following drawings and described below.

BRIEF DESCRIPTION OF THE DRAWINGS

The invention will be better understood and its advantage will become more apparent from the following description, especially in view of the accompanying drawings, wherein.

DETAILED DESCRIPTION OF THE INVENTION

The invention provides a simple, reliable system for automatically dosing vehicle fuel tanks with a fuel additive, particularly a concentrate containing a fuel borne catalyst (FBC), using gravity as the means of injection, preferably with no electronics or complex mechanical parts. It will be described in terms of a system for automatically dosing diesel truck fuel tanks with a fuel additive, particularly a concentrate containing fuel borne catalyst (FBC) using gravity as the driving force for injection into the fuel. The system will operate effectively to supply FBC additives to other vehicles as well, but this description is described in connection with diesel trucks as the preferred use of the invention. The dosing system provides for the addition of a known amount of fuel additive to diesel, gasoline, or other petroleum, biomass derived or similar or alternative carbonaceous fuels. It does so without any need for electronics, level gauges or operator involvement.

Figure 1:
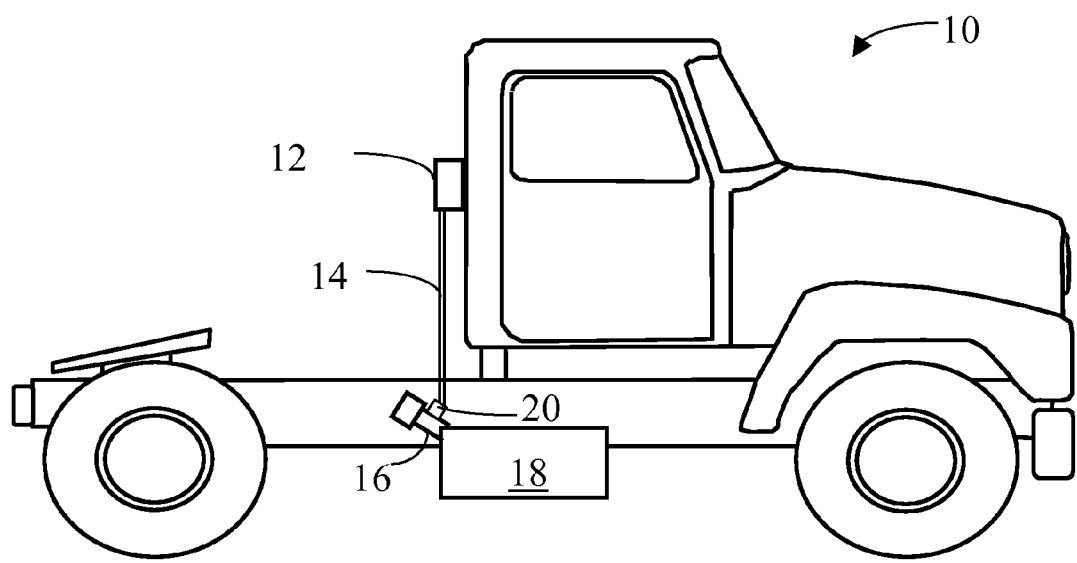
FIG. 1 shows a truck fitted with a novel additive dosing system of the invention that provides for the addition of a known amount of fuel additive from a storage vessel through a supply line which terminates with an opening into the filler spout of fuel tank.

The invention in its preferred forms comprises a normally closed valve that is opened by insertion of a fuel filler nozzle into a fuel tank filler spout to release additive for gravity feed from an additive reservoir tank mounted at an elevation above the fuel tank of an internal combustion engine. The valve is opened to dispense additive by a simple mechanical action. The valve can be threaded or otherwise affixed to a fill spout, such as in a module comprising an extension unit or a filler tube insert, allowing the valve to be easily used on existing fuel tanks. FIG. 1 shows a truck 10 fitted with a novel additive dosing system of the invention that provides for the addition of a know amount of fuel additive from a storage vessel 12 through a supply line 14 which terminates with an opening into the filler spout 16 of fuel tank 18 for holding diesel or other fuel where dosage with an additive would be beneficial.

The valve (shown as 20 in FIGS. 2 and 3) is normally biased closed and is opened by means of a mechanical valve actuator that depresses a spring 21 loaded ball 22 away from a seat 23 allowing additive to flow into the fuel tank. The valve actuator can be arranged as part of or to be in contact with a spring loaded flapper valve 24 affixed to the fuel fill spout extension unit 25. The flapper valve is normally in a position blocking the opening to the fuel filler spout 16 and is opened by the insertion of a fuel dispensing nozzle into the fuel fill spout during filling of the fuel tank with fuel. It is an advantage of the invention that such flapper valves are of the kind already in commercial use as a standard part of passenger car fuel tanks and can be easily adapted for use as part of the invention for larger fuel fill spouts used on large diesel engines.

An additive feed line 14 connects the ball-in-seat valve 20 to the additive reservoir 12 from which additive is directed by gravity feed to the ball-in-seat valve 20. An orifice plate (not shown) in the line or valve can be used to regulate flow to the valve and is sized to provide a set amount of additive flow during the time the valve is open. For example when 30 gals of fuel per minute are being dispensed by a fuel nozzle into the tank, the additive delivery rate is 75 ml per minute corresponding to an additive dose rate of 1:1500. Other dose rates can be set based on additive treat rate required or to match other standard fuel delivery rates.

An advantage of this system is that additive is dispensed proportional to fuel delivered to the fuel tank at the time fuel is delivered which avoids the over treatment or under treatment typical of systems that dispense additive based on engine run time or continuously treat fuel circulated to or from the engine.

Figure 2:
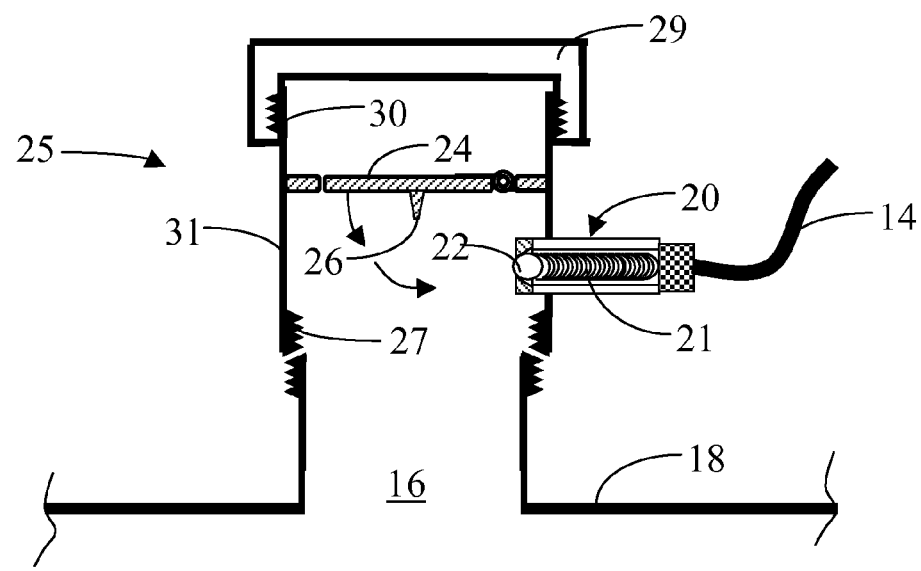
FIG. 2 is a schematic diagram of a preferred embodiment of an additive concentrate dosing system of the invention wherein operable components are provided in a modular unit adapted for retrofit of existing vehicles by securing to a fuel filler spout, and is shown in the normal at rest position.
Figure 3:
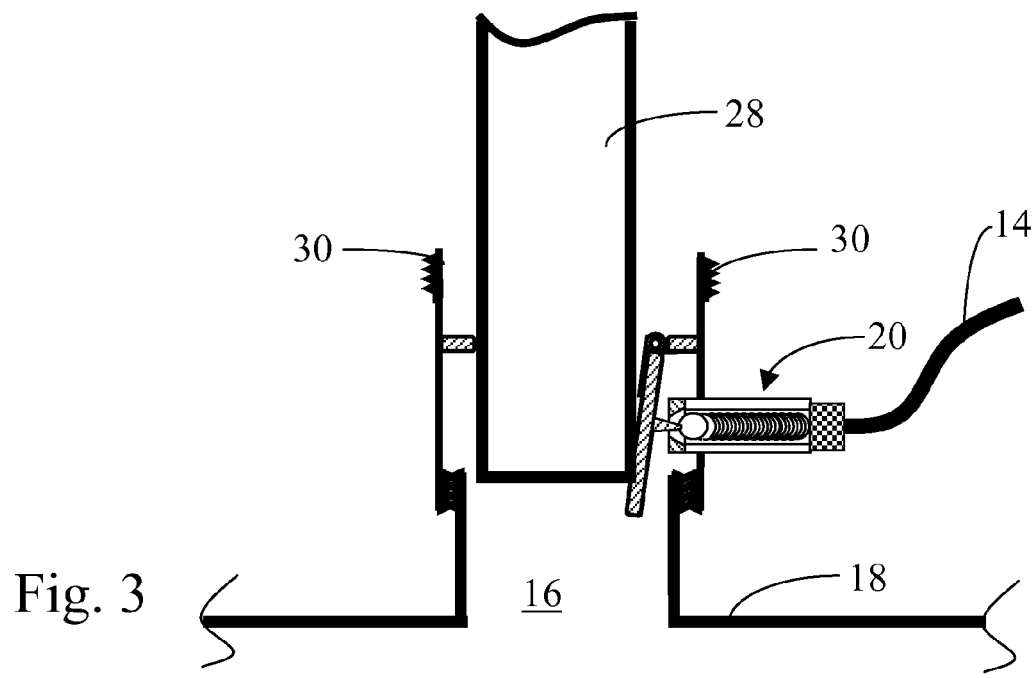
FIG. 3 is a schematic diagram of the additive concentrate dosing system of the invention as shown in FIG. 2, in the active, fueling position.

A first embodiment, shown in FIGS. 2 and 3, comprises a divide including the threaded fuel fill spout extension unit which houses the spring-loaded pivotable actuator 24, shown as a flapper valve, and integrated valve actuator projection 26. The ball-in-seat valve penetrates the side of the extension unit and is threaded, welded or otherwise affixed into extension unit 25 to prevent leakage of fuel or additive at the penetration of the fuel fill spout extension unit. The valve is connected to an additive reservoir 12 using standard tubing suitable for the specific additive being dispensed. The fuel fill spout extension unit 25 has a threaded coupler allowing it to be attached to the existing fuel spout of the fuel tank. A standard fuel cap 29 is used to seal the unit when not being used.

A ball-in-seat valve 20 is shown positioned at the end of the supply line 14 and is biased in normally closed position and operable to an open position by mechanically pressing ball 22 on the ball-in-seat valve 20. A pivotable actuator lever 24 (e.g., flapper valve) is positioned within the filler spout 16 and includes a projection 26 capable of mating with the ball-in-seat valve ball, or other release generally as 22, upon pivotable movement as shown by the arrow. Upon insertion of a filler hose into the filler spout 16, the filler hose (28 in FIG. 2) moves the lever and projection to press the release on the ball-in-seat valve.

The ball-in-seat valve 20 is shown as a spring loaded ball-in-seat valve wherein the ball 22 is biased toward the closed position, closing an opening 32 at the end of valve 20 for supply of additive from line 14. A spring 21 biases the ball 22 against the inside of the opening. The pivotable lever 24 is configured to move from an initial closed position wherein it interferes with the insertion of a filler hose 28 into the filler spout 16 but movable by the spout by the insertion of a filler hose to an open position wherein the projection 26 presses the ball 22 or other release (here the point of contact being with the ball 30 to depress the spring 21) on the ball-in-seat valve 20 to permit fluid additive to flow through line 14 into the filler spout 16 and from there into the tank 18 to mix with the fuel. When the filler hose 28 is removed from the filler spout 16, the pivotable actuator lever 24 resumes its initial closed position and the ball 30 or other suitable closure member closes the valve and stops the flow of additive.

The reservoir or fuel additive from a storage vessel 12 is preferably elevated sufficiently above the opening 21 to the valve 20 and the opening 21 of the valve is sized appropriately to cause the additive to flow freely at a predetermined rate into the tank 18 when the valve 20 is in the open position. The additive can flow at any predetermined rate, e.g., if the fuel fill rate is 30 gallons per minute, the ball-in-seat valve can be set to deliver about 75 ml of additive per minute—corresponding to a dose rate of 1:1500, so as to provide gravity feed from the additive reservoir at a rate that is proportionately matched to the rate of fuel addition to the fuel tank, e.g., within a range of 1:500–1:10,000.

FIGS. 1 and 2 illustrate a preferred embodiment wherein a filler spout extension module 25 is provided to include the various elements of the feed system of the invention described above, namely the ball-in-seat valve 20, the pivotable actuator lever 24 and projection 26. As shown in FIG. 1, the extension 25 is shown to comprise a threaded coupling 27, a cylindrical filler spout extension section 31 and a threaded upper end 30 to hold a conventional filler cap 29.

Figure 4:
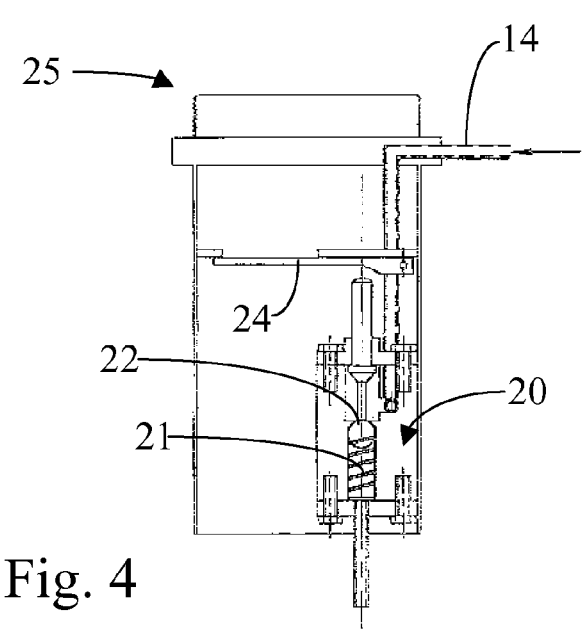
FIG. 4 is a schematic diagram of an alternative preferred embodiment of an additive concentrate dosing system of the invention wherein operable components are provided in a unit adapted for retrofit of existing vehicles by securing to a fuel filler spout, and is shown in the normal at rest position.
Figure 5:
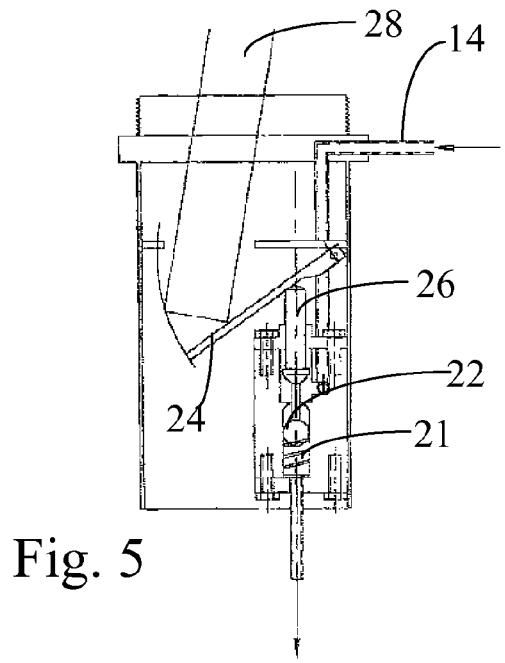
FIG. 5 is a schematic diagram of the additive concentrate dosing system of the invention as shown in FIG. 4, in the active, fueling position.

A second embodiment of the invention is shown in FIGS. 4 and 5, where the ball-in-seat actuator is mounted separately from the flapper valve e and is part of the ball-in-seat valve assembly. FIG. 4 shows the ball-in-seat valve in an opened position dispensing additive as the flapper valve is depressed from horizontal by a fuel dispensing nozzle. FIG. 5 shows the flapper valve closed in a horizontal position and the ball-in-seat valve closed after the fuel nozzle is removed from the fuel fill spout extension unit. Various fluid check and dispensing valves can be employed in place of the ball-in-seat variety, including those of the type used for pneumatic tire valves, typically having a plug and seat and an extension above the plug.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

The invention claimed is:

1. A simple, reliable system for automatically dosing fuel tanks with a fuel additive, particularly a concentrate containing a fuel borne catalyst (FBC) using gravity as the means of injection and is operable by insertion of a filler hose into the filler spout of a fuel tank, comprising:
   a supply line for feeding fuel additive by gravity from an additive reservoir and opening into a filler spout of a fuel tank;
   a ball-in-seat valve at the end of the supply line biased in normally closed position and operable to an open position by mechanically pressing a release on the ball-in-seat valve;
   a pivotable lever positioned within the filler spout and including a projection capable of mating with the ball-in-seat valve release upon pivotable movement, wherein the pivotable lever is configured to move from an initial position wherein it interferes with the insertion of a filler hose into the filler spout but movable by the spout by the insertion of a filler hose to a position wherein the projection presses the release on the ball-in-seat valve.

2. A system according to claim 1 wherein the ball-in-seat valve, the pivotable lever and the projection are comprised in a filler spout extension module.

3. A system according to claim 1 wherein the ball-in-seat valve, the pivotable lever and the projection are comprised in a module configured to fit within the opening of a filler spout.

4. A system of claim 1 where the dispensing of additives is by gravity feed from an additive reservoir at a rate that is proportionately matched to the rate of fuel addition to the fuel tank within a range of 1:500–1:10,000.

5. A system of claim 1 where the additive is a fuel borne catalyst, deposit modifier, cetane improver, cold flow improver, lubricity agent and/or biocide.

* * * * *